US012626395B2

(12) United States Patent
Grundhoefer et al.

(10) Patent No.: US 12,626,395 B2
(45) Date of Patent: May 12, 2026

(54) LOCATION AWARE VISUAL MARKERS

(71) Applicant: Apple Inc., Cupertino, CA (US)

(72) Inventors: Anselm Grundhoefer, Saratoga, CA
(US); Jeffrey S. Norris, Saratoga, CA
(US); Mohamed Selim Ben Himane,
Milpitas, CA (US); Paul Ewers, San
Francisco, CA (US); Scott G. Wade,
Santa Clara, CA (US); **Shih-Sang
(Carnaven) Chiu**, San Francisco, CA
(US); Thomas G. Salter, Foster City,
CA (US); Tom Sengelaub, Sunnyvale,
CA (US); Viral N. Parekh, Redwood
City, CA (US)

(73) Assignee: Apple Inc., Cupertino, CA (US)

( * ) Notice: Subject to any disclaimer, the term of this
patent is extended or adjusted under 35
U.S.C. 154(b) by 0 days.

(21) Appl. No.: 17/032,227

(22) Filed: Sep. 25, 2020

(65) Prior Publication Data

US 2021/0097714 A1 Apr. 1, 2021

Related U.S. Application Data

(60) Provisional application No. 62/907,163, filed on Sep.
27, 2019.

(51) Int. Cl.
*G06T 7/73* (2017.01)
*G06K 7/14* (2006.01)
(Continued)

(52) U.S. Cl.
CPC .............. *G06T 7/73* (2017.01); *G06K 7/1417*
(2013.01); *G06T 7/536* (2017.01); *G06T 7/60*
(2013.01);
(Continued)

(58) Field of Classification Search
CPC .. G06T 7/73; G06T 7/536; G06T 7/60; G06T
2207/10012; G06T 2207/10024;
(Continued)

(56) References Cited

U.S. PATENT DOCUMENTS

| | | | | |
|---|---|---|---|---|
| 8,752,758 B1 * | 6/2014 | Klebe | .................... | G01G 23/01 |
| | | | | 235/383 |
| 10,482,441 B1 * | 11/2019 | Watson | ................ | G06Q 20/202 |

(Continued)

FOREIGN PATENT DOCUMENTS

| | | |
|---|---|---|
| CN | 103827634 A | 5/2014 |
| CN | 107111361 A | 8/2017 |

(Continued)

OTHER PUBLICATIONS

"QR Code GPS Tracking"; GPS Tracking QR Codes with HTML5
Geolocation/qrd by; https://qrdby/tracking-qr-code-html5-
geolocation; May 23, 2019, ppgs. 1-11.
(Continued)

*Primary Examiner* — Nathan P Brittingham
(74) *Attorney, Agent, or Firm* — Thompson Hine LLP

(57) ABSTRACT

Various implementations disclosed herein include devices,
systems, and methods that determine the relative positioning
(e.g., offset) between a mobile electronic device and a visual
marker. In some implementations, the determined relative
positioning and a known position of the visual marker are
used to determine a position (e.g., geo coordinates) of the
mobile electronic device that is more accurate than existing
techniques. In some implementations, the determined rela-
tive positioning is used with a position of the mobile
electronic device to crowd source the stored position of the
visual marker. In some implementations, the determined
relative positioning and a position of the visual marker are
used to determine a position of an object detected in an
(Continued)

image by the mobile electronic device. In some implementations at an electronic device having a processor, locally-determined locations of a visual marker are received from mobile electronic devices that scan a visual marker.

19 Claims, 11 Drawing Sheets

(51) Int. Cl.
*G06T 7/536* (2017.01)
*G06T 7/60* (2017.01)
*G06F 3/01* (2006.01)

(52) U.S. Cl.
CPC .... *G06F 3/011* (2013.01); *G06T 2207/10012* (2013.01); *G06T 2207/10024* (2013.01); *G06T 2207/10028* (2013.01); *G06T 2207/30204* (2013.01)

(58) Field of Classification Search
CPC ........... G06T 2207/10028; G06T 2207/30204; G06K 7/1417; G06F 3/011
See application file for complete search history.

(56) References Cited

U.S. PATENT DOCUMENTS

| | | | | |
|---|---|---|---|---|
| 2006/0071790 | A1* | 4/2006 | Duron | G06K 17/00 340/572.1 |
| 2013/0045751 | A1 | 2/2013 | Chao et al. | |
| 2013/0166193 | A1 | 6/2013 | Goldman et al. | |
| 2014/0343846 | A1* | 11/2014 | Goldman | G01C 21/1654 701/525 |
| 2016/0021233 | A1* | 1/2016 | Savage | G06Q 10/1093 455/414.1 |
| 2016/0171767 | A1 | 6/2016 | Anderson | |
| 2017/0269617 | A1 | 9/2017 | Daoud | |
| 2019/0385342 | A1* | 12/2019 | Freeman | G06T 11/00 |
| 2020/0175765 | A1* | 6/2020 | McAdam | G06F 16/29 |
| 2020/0239231 | A1* | 7/2020 | Johnson | B25J 9/1679 |
| 2020/0402322 | A1* | 12/2020 | Chu | G06T 19/006 |
| 2021/0333797 | A1* | 10/2021 | Yu | G05D 1/0234 |

FOREIGN PATENT DOCUMENTS

| | | | | |
|---|---|---|---|---|
| CN | 109556616 | A | 4/2019 | |
| EP | 2 916 189 | A1 | 9/2015 | |
| JP | 2000-041173 | A | 2/2000 | |
| JP | 2003030628 | A | 1/2003 | |
| JP | 2008-309530 | A | 12/2008 | |
| JP | 2015-153046 | A | 8/2015 | |
| JP | 2017-219389 | A | 12/2017 | |
| JP | 2018-530797 | A | 10/2018 | |
| KR | 10-2014-0036543 | A | 3/2014 | |
| KR | 20140036543 | A * | 3/2014 | G06V 30/224 |

OTHER PUBLICATIONS

Tangri, Yashika, "QR Code for GPS Location: Make Your Marketing Strategy Better"; Scanova Blog; https://scanova.io/blog; Sep. 25, 2018, ppgs. 1-8.

European Patent Office, Search Report and Search Opinion, European Patent Application No. 20197733.7, 8 pages (Jan. 14, 2021).

Basiri, A. et al., "The Use of Quick Response (QR) Codes in Landmark-Based Pedestrian Navigation," International Journal of Navigation and Observation, vol. 2014, Article ID 897103, 7 pages (2014).

Katanacho, M. et al., "Surgical navigation with QR codes," Current Directions in Biomedical Engineering, vol. 2, No. 1, pp. 355-358 (2016).

Lee, Y. et al., Low-cost 3D motion capture system using passive optical markers and monocular vision, OPTIK, vol. 130, pp. 1397-1407 (2017).

Reuksupasompon, P. et al., "AR Development for Room Design," 15th International Joint Conference on Computer Science and Software Engineering (JCSSE), 6 pages (2018).

Zhang, H. et al., "Localization and navigation using QR code for mobile robot in indoor environment," Proceedings of the 2015 IEEE Conference on Robotics and Biomimetics, Zhuhai, China, Dec. 6-9, 2015 (2015).

Zheqi, L. et al., "Study on the Use of Q-R Codes as Landmarks for Indoor Positioning: Preliminary Results," Proceedings of IEEE/ION Plans 2018, The Institute of Navigation, Manassas, VA, pp. 1270-1276 (2018).

Japanese Patent Office, Notification of Reasons for Rejection (with English translation), Japanese Patent Application No. 2020-160425, 7 pages, Jun. 28, 2021.

Korean Intellectual Property Office, Notice of Preliminary Rejection (with English translation), Korean Patent Application No. 10-2020-0124626, 9 pages, Jun. 22, 2022.

China National Intellectual Property Administration, Patent Search Report (with English translation), Chinese Patent Application No. 2020110358507, 6 pages, Jan. 15, 2024.

China National Intellectual Property Administration, Patent Search Report (with English Translation), Chinese Patent Application No. 2020110358507, 5 pages, Jun. 7, 2024.

Lee, Y. and Yoo, H., Accepted Manuscript entitled "Low-Cost 3D Motion Capture System Using Passive Optical Markers and Monocular Vision", Optik—International Journal for Light and Electron Optics, http://dx.doi.org/10.1016/j.ijleo.2016.11.174, 34 pages, 2016.

European Patent Office, Examination Report (Communication Pursuant to Article 94(3) EPC), European Patent Application No. 20197733.7, 4 pages, Jul. 17, 2024.

China National Intellectual Property Administration, Chinese Office Action issued Jan. 15, 2024 [including English Translation], which pertains to Chinese Patent Application No. 202011035850.7. 14 pgs.

Korean Patent Office, Notice of Second Final Rejection issued Jan. 26, 2024 (English Translation), which pertains to Korean Patent Application No. 10-2020-0124626. 5 pgs.

Korean Intellectual Property Office, Notice of Last Preliminary Rejection (with English translation), Korean Patent Application No. 10-2020-0124626, 9 pages, Feb. 27, 2023.

Korean Intellectual Property Office, Notice of Last Preliminary Rejection (with English translation), Korean Patent Application No. 10-2020-0124626, 5 pages, Sep. 26, 2023.

Korean Intellectual Property Office, Notice of Last Preliminary Rejection (with English translation), Korean Patent Application No. 10-2024-0056625, 9 pages, May 28, 2025.

Ministry of Intellectual Property Korea, Written Decision on Registration issued in Korean Patent Application No. 10-2024-0056625 dated Dec. 31, 2025 with English translation (Eight (8) pages).

\* cited by examiner

Electronic Device  120

Memory 320

Operating System 330

Location Module 340

Visual Marker Detection Unit 342

Relative Positioning Unit 344

Location Determining Unit 346

Display(s) 312

Comm. Interface(s) 308

PU(s) 302

304

Image Sensor System(s) 314

Programming Interface(s) 310

I/O Device(s) & Sensor(s) 306

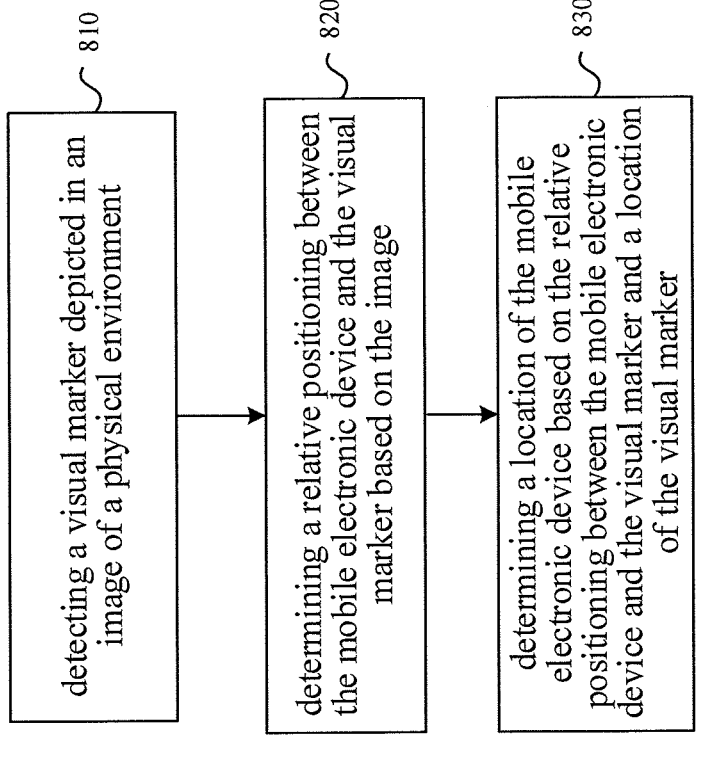

detecting a visual marker depicted in an image of a physical environment ⌒ 810 determining a relative positioning between the mobile electronic device and the visual marker based on the image ⌒ 820 determining a location of the mobile electronic device based on the relative positioning between the mobile electronic device and the visual marker and a location of the visual marker ⌒ 830

*FIGURE 8*

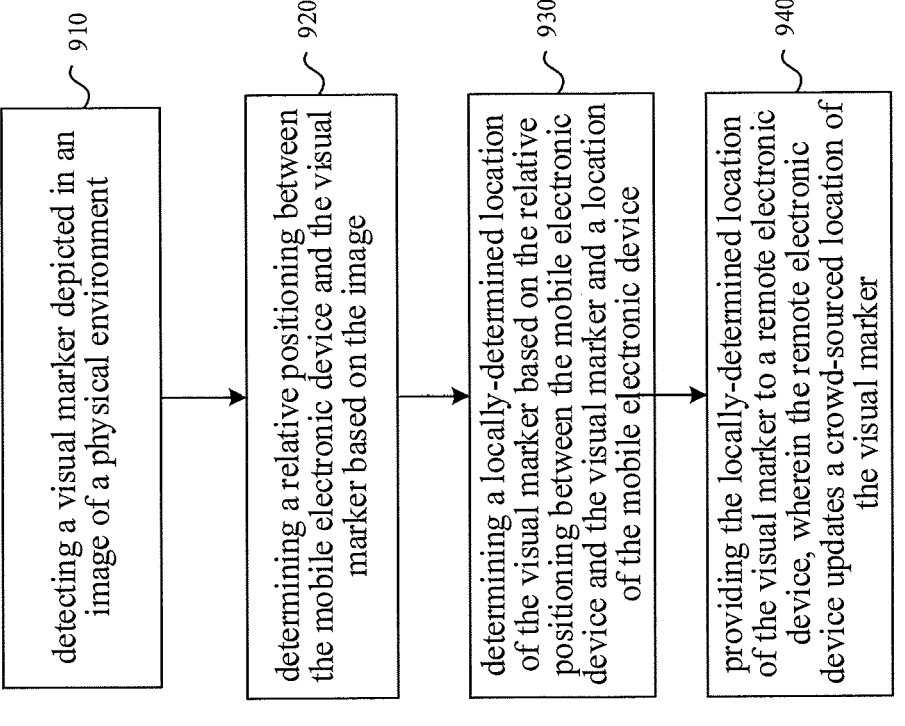

910 detecting a visual marker depicted in an image of a physical environment

920 determining a relative positioning between the mobile electronic device and the visual marker based on the image

930 determining a locally-determined location of the visual marker based on the relative positioning between the mobile electronic device and the visual marker and a location of the mobile electronic device

940 providing the locally-determined location of the visual marker to a remote electronic device, wherein the remote electronic device updates a crowd-sourced location of the visual marker

*FIGURE 9*

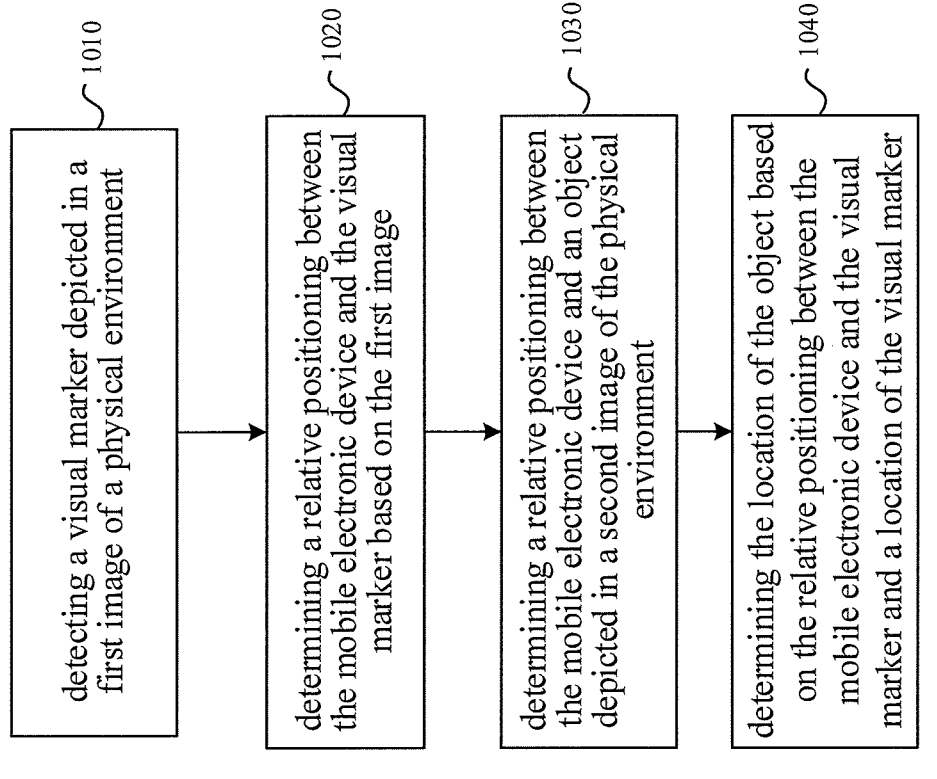

detecting a visual marker depicted in a first image of a physical environment ⌐1010 determining a relative positioning between the mobile electronic device and the visual marker based on the first image ⌐1020 determining a relative positioning between the mobile electronic device and an object depicted in a second image of the physical environment ⌐1030 determining the location of the object based on the relative positioning between the mobile electronic device and the visual marker and a location of the visual marker ⌐1040

*FIGURE 10* receiving locally-determined locations of the visual marker from mobile electronic devices that scan the visual marker, each of the locally-determined locations based on signal-based positioning ⌒ 1110 determining a combined location of the visual marker based on a plurality of the locally-determined locations ⌒ 1120

LOCATION AWARE VISUAL MARKERS

CROSS-REFERENCE TO RELATED APPLICATIONS

This application claims the benefit of U.S. Provisional Application Ser. No. 62/907,163 filed Sep. 27, 2019, which is incorporated herein in its entirety.

TECHNICAL FIELD

The present disclosure generally relates to electronic devices, and in particular, to systems, methods, and devices that involve electronic devices that capture images of visual markers to identify, share, or manage location information.

BACKGROUND

Visual markers exist today in the form of barcodes, Quick Response (QR) codes, and other proprietary code-based systems. QR codes encode binary data such as strings or other payloads to initiate payments, link to websites, link to location-based experiences or contextual-based experiences, or launch into other web-based experiences.

SUMMARY

Various implementations disclosed herein include devices, systems, and methods that determine the relative positioning (e.g., distance and direction, or offset) between a mobile electronic device and a visual marker (e.g., a visual marker including a location service or a "location aware" visual marker). In a first example, the determined relative positioning and a known position or stored position of the visual marker are used to determine a position (e.g., geo coordinates, pose, etc.) of the mobile electronic device that is more accurate than a locally-determined position of the mobile electronic device (e.g., a standalone position determined using its own sensors or received Global Positioning System (GPS) data).

In some implementations, at a mobile electronic device having a processor, a visual marker is detected in an image of a physical environment. In some implementations, a visual marker with a known location (e.g., having location data stored on an accessible network location) is detected in a 2D image or 3D image captured by the mobile electronic device. Then, a relative positioning between the mobile electronic device and the visual marker is determined based on the image. In some implementations, the relative positioning determines the relative orientation of the visual marker with respect to the mobile electronic device. In some implementations, the relative positioning is determined using computer vision techniques (e.g., Visual Inertial Odometry (VIO) or Simultaneous Localization and Mapping (SLAM) or Perspective-N-Point (PNP) techniques). In some implementations, the relative positioning determines distance or direction from the mobile electronic device to the visual marker. Then, a real-world location of the mobile electronic device is determined based on the relative positioning between the mobile electronic device and the visual marker and a known location of the visual marker. The known location of the visual marker may be provided by a remote location service (e.g., in the cloud) accessed based on uniquely-identifying information captured in the image of the visual marker.

Various implementations disclosed herein include devices, systems, and methods that determine the relative positioning (e.g., distance and direction, or offset) between a mobile electronic device and a visual marker. In a second example, the determined relative positioning is used with a position of the mobile electronic device (e.g., GPS) to revise the stored location associated with the deployed visual marker (e.g., crowd sourcing the stored location of the visual marker). In some implementations, a deployed visual marker is permanently mounted on or otherwise attached or affixed to a physical structure (e.g., statue or baseball stadium). In some implementations, when a visual marker is scanned by an electronic device, a new location of the visual marker (e.g., geo position) is determined. The new location may be determined by using data from the new scan with data from prior scans of the visual marker. For example, the new data may be combined or averaged with the prior data to increase the accuracy of a stored location of the visual marker. In some implementations, a crowd-sourced location of the visual marker is maintained by a remote location service accessible via the visual marker.

In some implementations at a mobile electronic device having a processor, a visual marker is detected in an image of a physical environment. In some implementations, a visual marker is detected in a 2D image or 3D image from the mobile electronic device. Then, a relative positioning between the mobile electronic device and the visual marker is determined based on the image. In some implementations, the relative positioning determines the relative orientation of the visual marker with respect to the mobile electronic device 420. In some implementations, the relative positioning is determined using computer vision techniques (e.g., VIO or SLAM) or PNP techniques. In some implementations, a location of the visual marker is determined based on a location of the mobile electronic device (e.g., locally determined via GPS, etc.). Then, the locally-determined location of the visual marker is provided to a remote electronic device, wherein the remote electronic device updates a crowd-sourced location of the visual marker using the locally-determined location.

Various implementations disclosed herein include devices, systems, and methods that determine the relative positioning (e.g., distance and direction, or offset) between a mobile electronic device and a visual marker (e.g., a location aware visual marker). In a third example, the determined relative positioning and a stored position (e.g., crowd-sourced) of the visual marker are used to determine a position (e.g., geo coordinates) of an object detected in an image of a physical environment by the mobile electronic device. In some implementations, the position of the object detected in the image of a physical environment by the mobile electronic device is determined based on the stored position of the visual marker, the relative position of the mobile electronic device to the visual marker, and the relative position of the mobile electronic device to the object. In one example, the object is detected in images before the visual marker is detected in an image of the physical environment by the mobile electronic device (e.g., upstream images). In another example, the object is detected in images after the visual marker is detected in an image of the physical environment by the mobile electronic device (e.g., downstream images). In some implementations, the position of the object determined using the stored location of the visual marker is more accurate than a locally-determined position of the object (e.g., a standalone position of the object determined by the mobile electronic device using its own sensors).

In some implementations at a mobile electronic device having a processor, a visual marker is detected in a first image of a physical environment. In some implementations, the visual marker is detected in a 2D image or 3D image from the mobile electronic device. Then, a relative positioning between the mobile electronic device and the visual marker is determined based on the first image. Then, a relative positioning between the mobile electronic device and an object depicted in a second image of the physical environment is determined. In some implementations, the relative positioning is determined using computer vision techniques (e.g., VIO or SLAM) or PNP techniques. In some implementations, the relative positioning determines the relative orientation of the visual marker with respect to the mobile electronic device. Then, the location of the object is determined based on the relative positioning between the mobile electronic device and the visual marker and a location of the visual marker. In some implementations, the first and second image may be the same image, or different images separated in time as a person moves the mobile electronic device (e.g., tracked movement of the mobile electronic device).

Various implementations disclosed herein include devices, systems, and methods that crowd-source a location of a deployed visual marker at an electronic device having a processor (e.g., a remote electronic device or server accessible via the visual marker). In some implementations, location information received by the electronic device (e.g., when users scan the deployed visual marker using mobile electronic devices) is used to update the crowd-sourced location of the visual marker. In some implementations, the additional location information received by the electronic device refines an accuracy of the crowd-sourced location of the visual marker. In some implementations, additional information related to the deployed visual marker (e.g., a size) is also crowd-sourced.

In some implementations at an electronic device having a processor, locally-determined locations of a visual marker are received from mobile electronic devices that scan a visual marker. In some implementations, each of the locally-determined locations is based on signal-based positioning (e.g. satellite/GPS-based, WiFi-based, or blue-tooth-based) of a respective mobile electronic device at a time of a respective scan of the visual marker. In some implementations, a combined location (e.g., crowd-sourced, average, weighted average, combination of a subset, time-based average of a subset, etc.) of the visual marker is determined based on a plurality of the locally-determined locations.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 8 is a flowchart illustrating an exemplary method of determining a relative positioning between a mobile device and a visual marker in accordance with some implementations.

FIG. 9 is a flowchart illustrating another exemplary method of determining a relative positioning between a mobile device and a visual marker in accordance with some implementations.

FIG. 10 is a flowchart illustrating an exemplary method of determining a location of an object based on a visual marker and the relative positions of a mobile electronic device to the visual marker and the object in accordance with some implementations.

Figure 1:
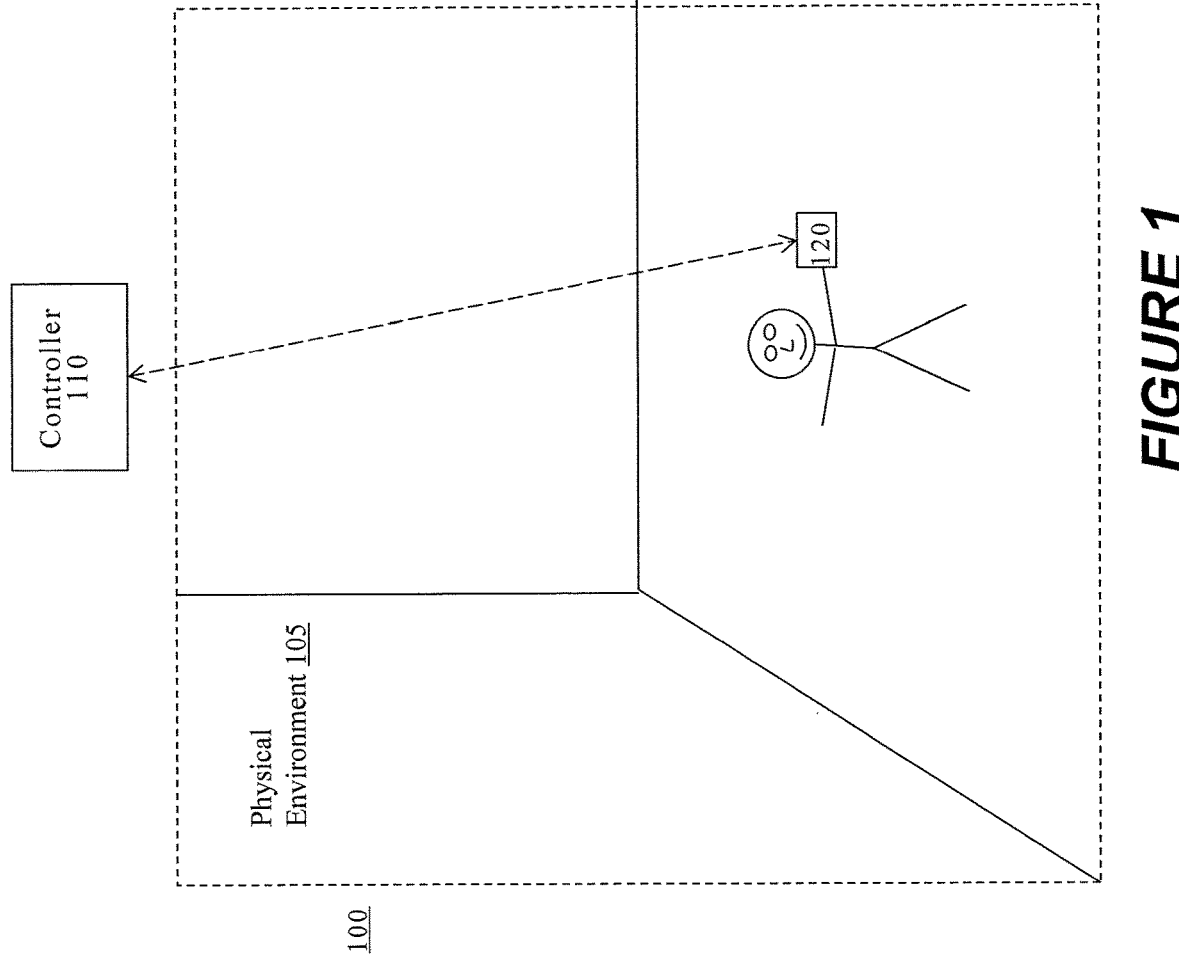
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
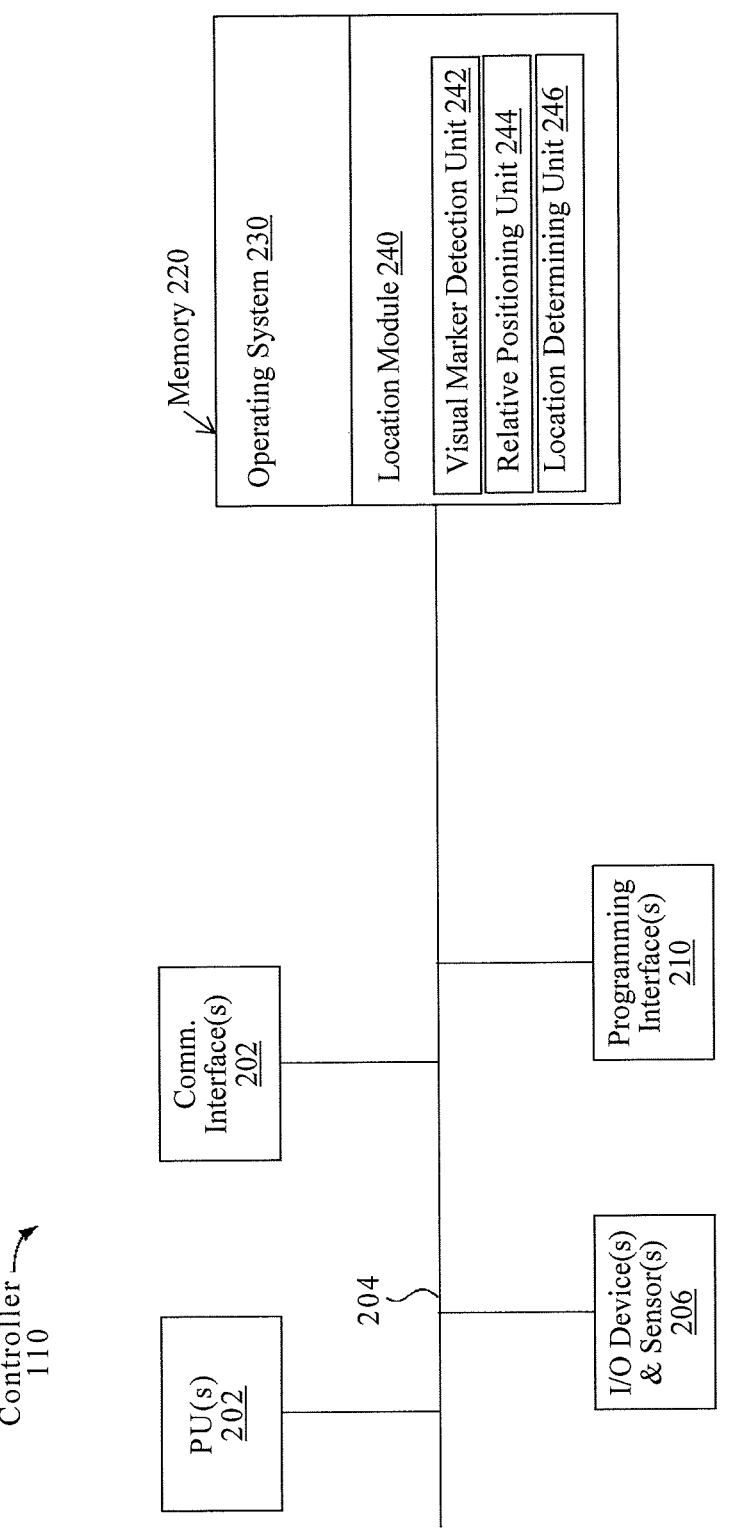
FIG. 2 is a block diagram of an example controller in accordance with some implementations.
Figure 3:
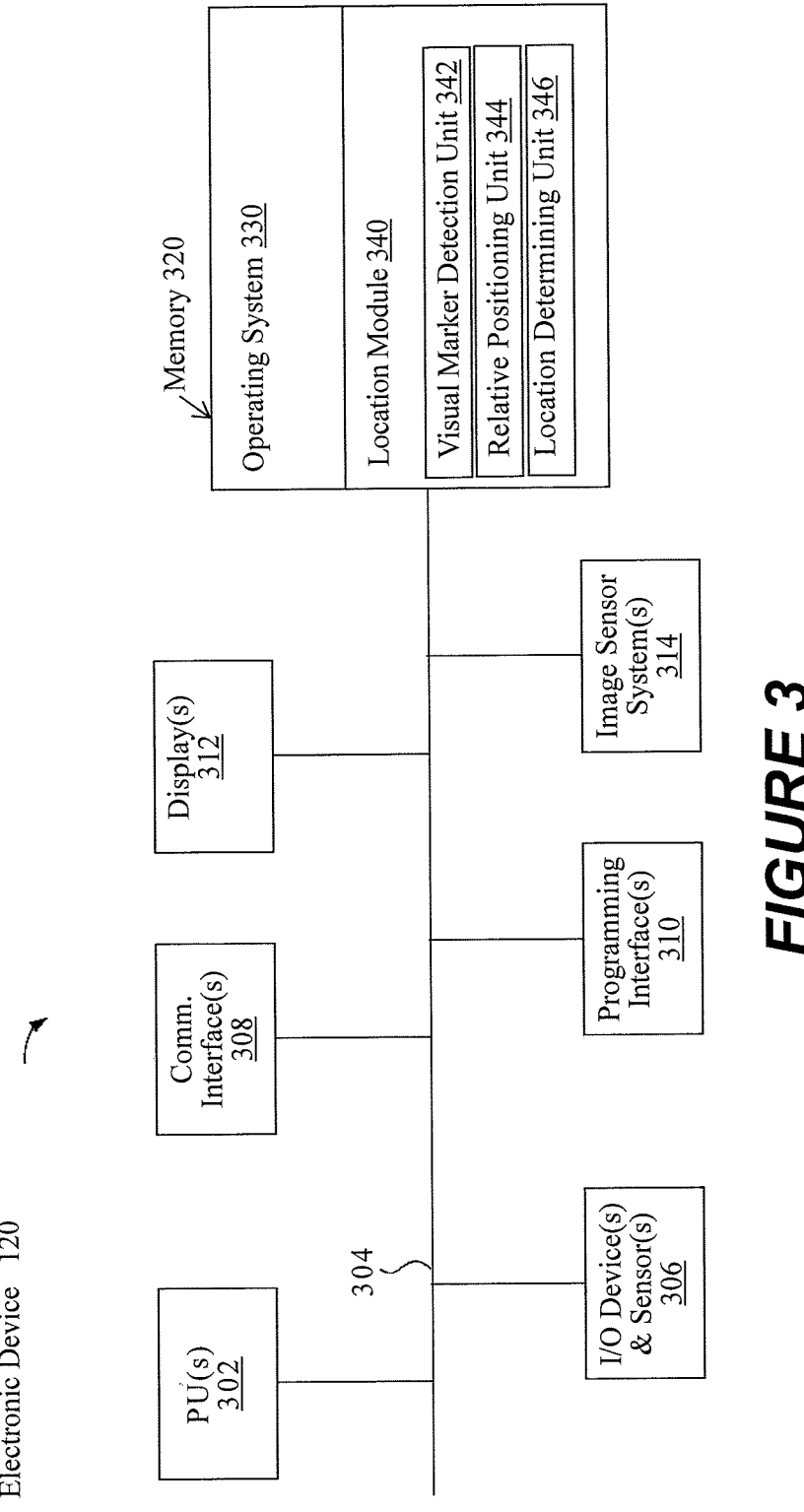
FIG. 3 is a block diagram of an example electronic device (e.g., head-mounted device (HMD)) in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving an electronic device, other implementations may involve other types of devices including, but not limited to, watches and other wearable electronic devices, mobile devices, laptops, desktops, gaming devices, head mounted devices (HMDs), home automation devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120, one or both of which may be in a physical environment. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a computer-generated reality (CGR) environment for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.).

In some implementations, the controller 110 and the electronic device 120 are configured to present the CGR environment to the user together.

In some implementations, the electronic device 120 is configured to present the CGR environment to the user. In some implementations, the electronic device 120 includes a suitable combination of software, firmware, or hardware. The electronic device 120 is described in greater detail below with respect to FIG. 3. In some implementations, the functionalities of the controller 110 are provided by or combined with the electronic device 120, for example, in the case of an electronic device that functions as a stand-alone unit.

According to some implementations, the electronic device 120 presents a CGR environment to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (CGRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other nonvolatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a location module 240.

The operating system 230 includes procedures for handling various basic system services and for performing hardware dependent tasks.

In some implementations, the location module 240 is configured to identify, share, or manage location information. In some implementations, the location module 240 includes a visual marker detection unit 242, a relative positioning unit 244, and an location determination unit 246. The visual marker detection unit 242 is configured to detect and identify visual markers in images of a physical environment. The relative positioning unit 244 is configured to determine relative positioning to a detected object or visual marker from images of the physical environment. The location determination unit 246 is configured to determine a calculated location of objects given a geolocation (crowd-sourced or signal-based positioning) and determined relative positionings.

The location module 240 may be implemented as part of a CGR application that is configured to present virtual content (e.g., 3D content) that will be used as part of CGR environments for one or more users. For example, the user may view and otherwise experience a CGR-based user interface that allows the user to select, place, move, and otherwise present a CGR environment, for example, based on the virtual content location via hand gestures, voice commands, input device inputs, etc.

Although these modules and units are shown as residing on a single device (e.g., the controller 110), it should be understood that in other implementations, any combination of these modules and units may be located in separate computing devices. Moreover, FIG. 2 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a CGR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user.

The memory 320 includes high-speed random-access memory, such as DRAM, CGRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR module 340.

The operating system 330 includes procedures for handling various basic system services and for performing hardware dependent tasks.

In some implementations, the location module 340 is configured to identify, share, or manage location information. In some implementations, the location module 340 includes a visual marker detection unit 342, a relative positioning unit 344, and a location determination unit 346. The visual marker detection unit 342 is configured to detect and identify visual markers in images of a physical environment. The relative positioning unit 344 is configured to determine relative positioning to a detected object or visual marker from images of the physical environment. The location determination unit 346 is configured to determine a calculated location of objects given a geolocation (crowd-sourced or signal-based positioning) and determined relative positionings.

The location module 340 may be implemented as part of a CGR application that is configured to present virtual content (e.g., 3D content) that will be used as part of CGR environments for one or more users. For example, the user may view and otherwise experience a CGR-based user interface that allows the user to select, place, move, and otherwise present a CGR environment, for example, based on the virtual content location via hand gestures, voice commands, input device inputs, etc.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
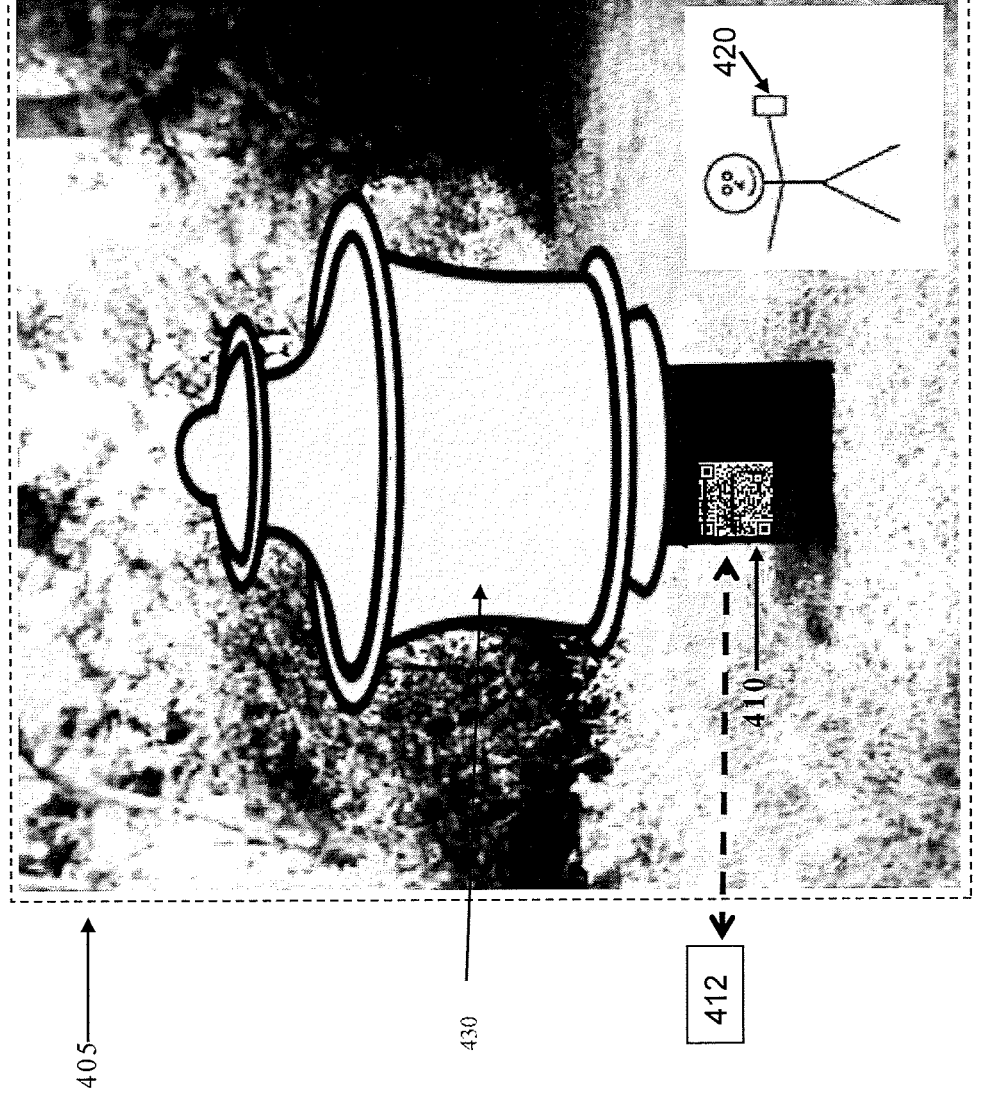
FIG. 4 is a diagram illustrating a geolocation of an electronic device determined using a relative positioning between the electronic device and a visual marker in accordance with some implementations.

FIG. 4 is a diagram illustrating a geolocation of an electronic device determined using a relative positioning between the electronic device and a visual marker in accordance with some implementations. As shown in FIG. 4, a visual marker 410 is positioned at a known geolocation and is mounted on a statue 430 in a physical environment 405. In FIG. 4, the physical environment 405 is a park. In some implementations, the electronic device 420 is a mobile electronic device.

As shown in FIG. 4, in some implementations the electronic device 420 detects the visual marker 410 in an image of the physical environment 405. In some implementations, the electronic device 420 detects the visual marker 410 in a plurality of images of the physical environment 405. In some implementations, the image(s) is a 2D image or 3D image at the electronic device 420.

Figure 5:
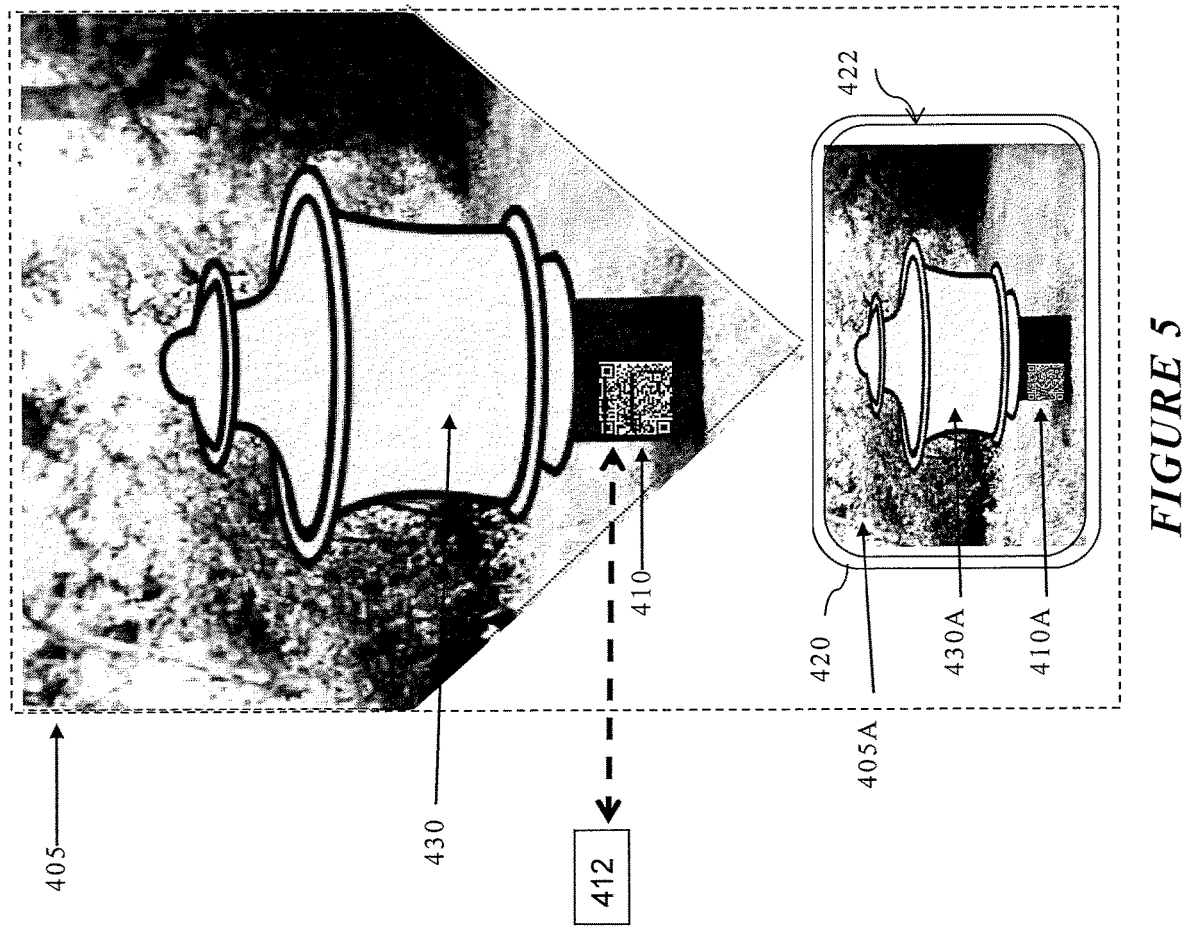
FIG. 5 is a diagram illustrating a geolocation of an electronic device determined using a relative positioning between the electronic device and a visual marker using images of the physical environment including the visual marker in accordance with some implementations.

In some implementations, real world items exist in the physical environment 405 and can be viewed using the electronic device 420. As shown in FIG. 5, the visual marker 410A and a statue 430A are concurrent real-time representations in a CGR environment 405A of the visual marker 410 and the statue 430 in the physical environment 405. In FIG. 5, the CGR environment 405A is shown at a display 422 of the electronic device 420.

In various implementations, visual markers 410 are 2D objects that encode binary data such as strings (e.g., QR codes) or other payloads used to access remotely-based experiences 412. In some implementations, the links to the remotely-based experiences 412 include links to initiate payments (e.g., sanctioned payment endpoints), links to websites (e.g., URLs), or links that launch into web-based experiences. In some implementations, visual markers 410 are used to launch only into or link only to sanctioned remotely-based experiences 412 authorized by the creator of the visual marker 410.

In some implementations, the remotely-based experiences 412 include a location service that provides a geolocation of the deployed visual marker 410.

As shown in FIG. 4 and FIG. 5, the electronic device 420 can determine a relative positioning between the electronic device 420 and the visual marker 410 based on the image or images (e.g., the CGR environments 405A) of the physical environment 405 including the visual marker 410. In some implementations, the relative positioning determines the relative orientation of the visual marker 410 with respect to the electronic device 420. In some implementations, the relative positioning is determined using computer vision techniques (e.g., VIO or SLAM) or PNP techniques. In some implementations, relative positioning is determined based on stereo image processing (e.g., disparity-based estimation). In some implementations, the relative positioning determines distance or direction from the electronic device 420 to the visual marker 410. In some implementations, the relative positioning determines the pose (e.g., position and orientation) of the detected visual marker 410 relative to the pose of the electronic device 420.

In some implementations, the relative positioning is determined at the electronic device 420 by identifying the size or scale of the detected visual marker 410 in the captured image. In some implementations, a distance between the electronic device 420 and the detected visual marker 410 can be determined based on the size of the visual marker 410. In some implementations, the size or shape of visual marker 410 can be encoded in the visual marker 410 and then directly decoded from the image of physical environment 405. In some implementations, the size or shape (e.g., parametric description) of visual marker 410 can be provided by a remote location service (e.g., see location service 650) accessible via the visual marker 410. In some implementations, the size or shape of visual marker 410 is preset and known by the electronic device 420. In some implementations, the size or shape of visual marker 410 is determined using VIO, SLAM, RGB-D image processing or the like at the electronic device 420.

Alternatively, the distance between the electronic device 420 and the detected visual marker 410 can be determined based on a depth sensor at the electronic device 420 a detecting the visual marker 410 in the physical environment 405. In some implementations, the depth sensor at the electronic device 420 uses stereo-based depth estimation. In some implementations, the depth sensor at the electronic device 420 is a depth-only sensor (e.g., time of flight, structured light).

In some implementations, the relative positioning determines a direction from the electronic device 420 to the detected visual marker 410 in the captured image of the physical environment 405 including the visual marker 410. In some implementations, once the size or shape of the visual marker 410 is determined, the four corners (e.g., of a square or rectangular visual marker) or circumference (e.g., of a circular visual marker) can be identified in the image. In some implementations, identifying or correcting a distortion between an actual shape of the visual marker 410 and the detected shape of the visual marker 410 in the image determines a direction between the electronic device 420 and the detected visual marker 410 in the physical environment 405.

In some implementations, the relative positioning determines the distance and direction (e.g., offset) between the electronic device 420 and the detected visual marker 410 using VIO, SLAM or the like at the electronic device 420.

As shown in FIG. 4 and FIG. 5, once the relative positioning between the electronic device 420 and the visual marker 410 is determined, a calculated geolocation of the electronic device 420 can be determined using the relative positioning and a geolocation of the visual marker 410. In some implementations, the geolocation of the visual marker 410 is provided to the electronic device by a remote location service accessible using the visual marker 410. In some implementations, the geolocation of the visual marker 410 is stored in a remote electronic device. In some implementations, the geolocation of the visual marker 410 is stored in the cloud. In some implementations, the geolocation of the visual marker 410 is encoded in the visual marker 410.

In some implementations, the calculated geolocation of the electronic device 420 is more accurate than a locally-determined position of the electronic device 420. In some implementations, the locally-determined position of the electronic device 420 is determined using a satellite-based system and a sensor on the electronic device 420. In some implementations, the locally-determined position of the electronic device 420 is determined using a GPS sensor on the electronic device 420.

Figure 6:
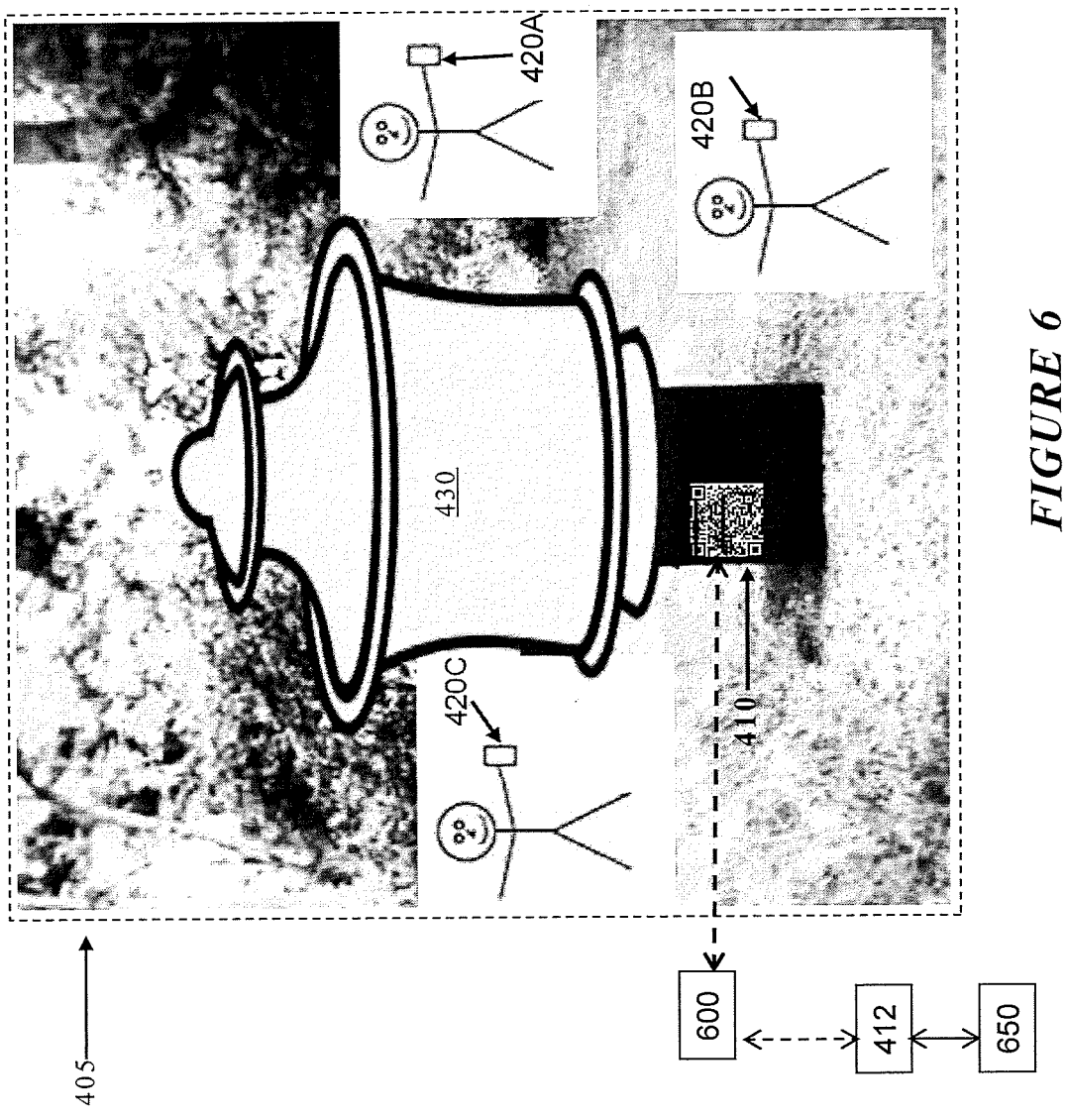
FIG. 6 is a diagram illustrating a crowd-sourced geolocation of a visual marker determined using a relative positioning between a plurality of electronic devices and the visual marker in accordance with some implementations.

FIG. 6 is a diagram illustrating a crowd-sourced geolocation of a visual marker determined using a relative positioning between a plurality of electronic devices and a visual marker in accordance with some implementations. As shown in FIG. 6, the visual marker 410 is positioned at a known or unknown geolocation and is mounted on the statue 430 in the physical environment 405.

As shown in FIG. 6, in some implementations a plurality of electronic devices 420A, 420B, 420C each detects the visual marker 410 in one or more images of the physical environment 405. In some implementations, the image(s) is a 2D image or 3D image at the electronic device 420A, 420B, 420C.

As shown in FIG. 6, each of the plurality of electronic devices 420A, 420B, 420C can determine a relative positioning between the electronic device 420A, 420B, 420C and the visual marker 410 detected in the one or more images of the physical environment 405 including the visual marker 410. In some implementations, the relative positioning determines the relative orientation of the visual marker 410 with respect to the electronic device 420. In some implementations, the relative positioning is determined using computer vision techniques (e.g., VIO or SLAM) or PNP techniques. In some implementations, the relative positioning determines distance or direction from the electronic device 420A, 420B, 420C to the visual marker 410. In some implementations, the relative positioning determines the pose (e.g., position and orientation) of the detected visual marker 410 relative to the pose (e.g., position and orientation) of the electronic device 420A, 420B, 420C. As shown in FIG. 6, the relative positioning (e.g., offset) to the visual marker 410 can be individually determined by each of the electronic devices 420A, 420B, 420C as described above with respect to FIG. 4 and FIG. 5.

As shown in FIG. 6, once the relative positioning between the electronic device 420A and the visual marker 410 is determined, a locally-determined geolocation of the visual marker 410 can be determined by the electronic device 420A using the relative positioning and a locally-determined position (e.g., geolocation) of the electronic device 420A. In some implementations, the locally-determined position of the electronic device 420A is determined using a sensor on the electronic device 420A such as a GPS sensor. In some implementations, the locally-determined position uses local signal-based positioning (e.g. satellite/GPS-based, WiFi-based, or blue-tooth-based) of the electronic device 420A at a time of a respective scan of the visual marker 410.

In some implementations, the locally-determined geolocation of the visual marker 410 determined by the electronic device 420A is provided to a remote location service 650 accessible via the visual marker 410. In some implementations, the locally-determined geolocation of the visual marker 410 determined by the electronic device 420A is provided to the remote location service 650 of the visual marker 410 using the remotely-based experiences 412 accessible via the visual marker 410. In some implementations, the locally-determined geolocation of the visual marker 410 from the electronic device 420A is stored by the location service 650 in a remote electronic device (e.g., the cloud). In some implementations, the location service 650 is part of or co-located with the remotely-based experiences 412.

Similarly, once the relative positioning between the electronic device 420B and the visual marker 410 is determined, a locally-determined geolocation of the visual marker 410 can be determined by the electronic device 420B using the relative positioning and a locally-determined position (e.g., geolocation) of the electronic device 420B. In some implementations, the locally-determined position uses local signal-based positioning (e.g. satellite/GPS-based, WiFi-based, or blue-tooth-based) of the electronic device 420B at a time of a respective scan of the visual marker 410.

Similarly, once the relative positioning between the electronic device 420C and the visual marker 410 is determined, a locally-determined geolocation of the visual marker 410 can be determined by the electronic device 420C using the relative positioning and a locally-determined position (e.g., geolocation) of the electronic device 420C. In some implementations, the locally-determined position uses local signal-based positioning (e.g. satellite/GPS-based, WiFi-based, or blue-tooth-based) of the electronic device 420C at a time of a respective scan of the visual marker 410.

At the location service 650, the geolocation of the visual marker 410 can be revised or crowd-sourced using locally-determined geolocations from a plurality of electronic devices such as the electronic devices 420A, 420B, 420C that respectively scan the visual marker 410. In some implementations, the crowd-sourced geolocation of the visual marker 410 determined by the location service 650 is more accurate than a single locally-determined position by one electronic device.

In some implementations, the crowd-sourced geolocation of the visual marker 410 determined by the location service 650 is a combination (e.g., average) of all reported locally-determined geolocations from electronic devices that scan the visual marker 410. In some implementations, the crowd-sourced geolocation of the visual marker 410 determined by the location service 650 is a weighted combination of a subset of all reported locally-determined geolocations from electronic devices that scan the visual marker 410. In some implementations, the weighted combination used by the location service 650 is based on a confidence factor associated with the reporting electronic device. In some implementations, the confidence factor is based on one or more of a type of sensor array at the electronic device (e.g. good depth sensor gets higher confidence), GPS granularity, distance to the visual marker, lighting, etc. In some implementations, the crowd-sourced geolocation of the visual marker 410 determined by the location service 650 can consider an age of an observation or ignore outlier locally-determined geolocations. In some implementations, the crowd-sourced geolocation of the visual marker 410 determined by the location service 650 identifies a clustering of new observations in a new location that suggests movement of a visual marker (e.g., a moving visual marker) so an older locally-determined geolocations or locally-determined geolocations of a previous geolocation of the visual marker should be discarded. In some implementations, the crowd-sourced geolocation of the visual marker 410 determined by the location service 650 is accurate to 1 meter or less.

In some implementations, the crowd-sourced geolocation of the visual marker 410 determined by the location service 650 does not use or track any personally identifiable information (PII) from the electronic devices (e.g., electronic device 420A, 420B, 420C, . . . ) that scan the visual marker 410. In some implementations, locally-determined locations of the visual marker 410 are sent to the location service 650 without sending any PII of the electronic devices. In some implementations, an intermediate electronic device 600 receives the information (including the locally-determined locations of the visual marker 410) from the electronic devices (e.g., electronic device 420A, 420B, 420C, . . . ) and removes any PII before forwarding the locally-determined locations of the visual marker 410 from the electronic devices to the location service 650. In some implementations, the intermediate electronic device 600 protects the privacy of the electronic devices (e.g., electronic device 420A, 420B, 420C, . . . ) because the location service 650 (or the remotely-based experiences 412) does not have access to any PII (identification or location) of the electronic devices.

In some implementations, a size of the visual marker 410 is crowd-sourced. In some implementations, each of the electronic devices that scan the visual marker 410 individually or locally-determines a size of the visual marker 410 and reports its locally determined size of the visual marker 410 to a remote size calculation service accessible via the remotely-based experiences 412. In some implementations, the location service 650 also controls or implements the crowd-sourced size of the visual marker 410.

Figure 7:
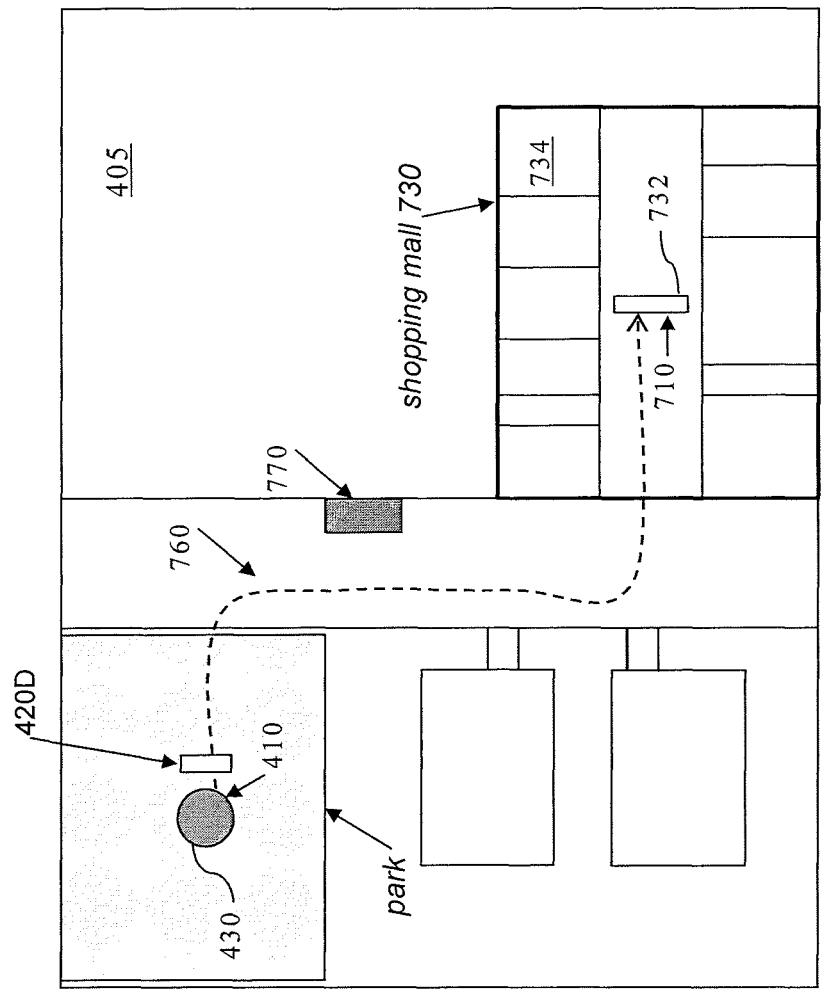
FIG. 7 is a diagram illustrating determining a location of an object based on a visual marker by using a relative positioning between an electronic device and the visual marker and using a relative positioning between the electronic device and the object in accordance with some implementations.

FIG. 7 is a diagram illustrating determining a location of an object based on a visual marker by using a relative positioning between an electronic device and the visual marker and using a relative positioning between the electronic device and the object in accordance with some implementations. As shown in FIG. 7, the visual marker 410 includes a geolocation and is mounted on the statue 430 in the park in the physical environment 405.

As shown in FIG. 7, in some implementations an electronic device 420D detects the visual marker 410 in one or more images of the physical environment 405. In some implementations, the image(s) is a 2D image or 3D image at the electronic device 420D.

As shown in FIG. 7, the electronic device 420D can determine a relative positioning between the electronic device 420D and the visual marker 410 detected in the one or more images of the physical environment 405 including the visual marker 410. In some implementations, the relative positioning determines the relative orientation of the visual marker 410 with respect to the electronic device 420. In some implementations, the relative positioning is determined using computer vision techniques (e.g., VIO or SLAM) or PNP techniques. As shown in FIG. 7, the relative positioning (e.g., offset) to the visual marker 410 can be individually determined by the electronic device 420D as described above with respect to FIG. 4 and FIG. 5.

As shown in FIG. 7, once the relative positioning between the electronic device 420D and the visual marker 410 is determined, a calculated geolocation of the electronic device 420D can be determined using the relative positioning and a geolocation of the visual marker 410. The geolocation of the visual marker 410 is provided to the electronic device 420D by a remote location service (e.g., the location service 650) accessible using the visual marker 410. In some implementations, the geolocation of the visual marker 410 provided to the electronic device 420D is crowd-sourced by the remote location service. In some implementations, the calculated geolocation of the electronic device 420D is more accurate than a locally-determined signal-based position (e.g. satellite/GPS-based, WiFi-based, or blue-tooth-based) of the electronic device 420D because of the accuracy of the geolocation of the visual marker 410.

As shown in FIG. 7, a path 760 of the electronic device 420 can be tracked during movement of the electronic device 420D from a first position at which the image of the visual marker 410 was captured. In some implementations, the path 760 is determined using sensors at the electronic device 420D. In some implementations, the path 760 is determined using inertial sensors, VIO, SLAM or the like at the electronic device 420D.

As shown in FIG. 7, along the path 760 from the statue 430 to the pedestal 732, the electronic device 420D passed a food truck 770 and obtained one or more images of the food truck 770 in the physical environment 405. In some implementations, the electronic device 420D determines a relative positioning between the electronic device 420D and the food truck 770 depicted in one or more images of the physical environment 405 including the food truck 770. In some implementations, the relative positioning (e.g., offset) to the food truck 770 can be individually determined by the electronic device 420D as described above with respect to FIG. 4 and FIG. 5.

In some implementations, the electronic device 420D determines the geolocation of the food truck 770 based on the provided geolocation of the visual marker 410, the relative positioning between the electronic device 420D and the visual marker 410, the tracking of the path 760 of the electronic device 420D, and the relative positioning between the electronic device 420D and the food truck 770.

As shown in FIG. 7, the path 760 ends at a visual marker 710 mounted on a pedestal 732 showing a physical map of a shopping mall 730 in the physical environment 405. Again, the electronic device 420D can determine a relative positioning between the electronic device 420D and the visual marker 710 detected in one or more images of the physical environment 405 including the visual marker 710. In some implementations, the relative positioning (e.g., offset) to the visual marker 710 can be individually determined by the electronic device 420D as described above with respect to FIG. 4 and FIG. 5.

In some implementations, once the relative positioning between the electronic device 420D and the visual marker 710 is determined, a second calculated geolocation of the electronic device 420D can be determined using the relative positioning and a geolocation of the visual marker 710. The geolocation of the visual marker 710 is provided to the electronic device 420D by a remote location service (e.g., the location service 650) accessible using the visual marker 710. In some implementations, the geolocation of the visual marker 710 provided to the electronic device 420D is crowd-sourced by the remote location service. In some implementations, the second calculated geolocation of the electronic device 420D is more accurate than a locally-determined signal-based position (e.g. satellite/GPS-based, WiFi-based, or blue-tooth-based) of the electronic device 420D because of the accuracy of the geolocation of the visual marker 710.

In some implementations, the accuracy of the second calculated geolocation of the electronic device 420D allows for CGR interactions with the physical environment 405. For example, once the electronic device 420D scans the visual marker 710 and determines the second calculated geolocation of the electronic device 420D, CGR footsteps showing directions relative to the floor of the shopping mall 730 could guide the user of the electronic device 420D from the pedestal 732 to a selected store 734 in the shopping mall 730.

In some implementations, the electronic device 420D updates the geolocation of the food truck 770 based on the provided geolocation of the visual marker 710, the relative positioning between the electronic device 420D and the visual marker 710, the tracking of the path 760 of the electronic device 420D, and the relative positioning between the electronic device 420D and the food truck 770 by updating the geolocation at which foodtruck 770 was observed along path 760 using the newly determined geolocation provided by visual marker 710.

In some implementations, the electronic device 420D stores a local map of listing of visual markers 410, 710 and their geolocations. In some implementations, the location service 650 stores a map or listing of visual markers 410, 710 and their geolocations. In some implementations, the location service 650 stores a map or listing of visual markers and their geolocations within a prescribed distance of each other or overall. In some implementations, when queried by an electronic device 420, the location service 650 provides a map or listing of visual markers and their geolocations within a prescribed distance or related to a certain subject (e.g., historical structures).

As shown in FIG. 7, the visual detection of the visual marker 410, the visual detection of the food truck 770, and the visual detection of the visual marker 710 in the physical environment 405 by the electronic device 420D are in different images (e.g., one or more images) that are separated in time. In some implementations, the visual detection of the visual marker 410 and the visual detection of the food truck 770 by the electronic device 420D can be in the same image (e.g., one or more images). In some implementations, the visual detection of the food truck 770 and the visual detection of the visual marker 710 by the electronic device 420D can be in the same image (e.g., one or more images). In some implementations, the visual detection of the visual marker 410, the visual detection of the food truck 770, and the visual detection of the visual marker 710 by the electronic device 420D can be in the same image (e.g., one or more images).

In some implementations, visual markers are mounted on objects that can move. For example, visual markers can be mounted on food trucks that repeatedly move, periodically move, or day-by-day move their location. Alternatively, a food truck could move to different locations for breakfast, lunch, and dinner. In some implementations, metadata associated with the visual marker identifies the visual marker as a moving visual marker and the associated geolocation of the moving visual marker is updated based on a time threshold or a position change threshold (e.g., with older observed locations being discarded or de-weighted, large differences in observed locations suggesting the visual marker has been moved and previous observations should be discarded or de-weighted, etc.). In some implementations, each changeable geolocation of the moving visual marker is crowd-sourced. In some implementations, metadata associated with the visual marker or the moving visual marker is maintained at the remote location service (e.g., location service 650).

In some implementations, metadata associated with the visual marker is maintained at the remotely-based experiences 412 or the remote location service 650. In some implementations, the metadata associated with the visual marker contain information related to the remotely-based experiences 412. In some implementations, the metadata associated with the visual marker defines parameters for when or how a deployed visual marker at a physical location is valid. For example, the metadata associated with a visual marker at a restaurant can alternately launch into a web-based experience showing the menu of the restaurant when the restaurant is open (e.g., 8 AM to 6 PM), but launch into web-based experience showing just the hours of operation when the restaurant is closed.

As shown in FIGS. 4-7, in some implementations the image of the physical environment 405 is obtained using a sensor (e.g., camera) on the electronic device 420. In some implementations, the sensor can be a RGB camera, stereo cameras, a depth sensor (e.g., time of flight, structured light), a RGB-D camera, one or more 2D cameras, IR cameras, or the like. In some implementations, color images can be used. Alternatively, in some implementations, grayscale images can be used.

FIGS. 4-7 illustrates electronic devices 420. The electronic devices 420 can include some or all the features of one or both of the controller 110 and the electronic device 120.

FIG. 8 is a flowchart illustrating an exemplary method of determining a relative positioning between a mobile device and a visual marker in accordance with some implementations. In some implementations, the method 800 is performed by a device (e.g., controller 100 or electronic device 120 of FIGS. 1-3). The method 800 can be performed for CGR environments using an electronic device or by multiple devices in communication with one another. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 detects a visual marker in an image of a physical environment. In some implementations, a visual marker with a known location is detected in a 2D image or 3D image of a mobile electronic device.

At block 820, the method 800 determines a relative positioning between the mobile electronic device and the visual marker based on the image. In some implementations, the relative positioning is determined using computer vision techniques (e.g., VIO or SLAM) or PNP techniques. In some implementations, the relative positioning determines distance or direction from the mobile electronic device to the visual marker. In some implementations, distance may be based on using a stored or encoded size of the visual marker and the size of the visual marker in the image. In some implementations, distance may be based on RGB-D image processing. In some implementations, distance may be based on SLAM image processing. In some implementations, distance may be based on stereo image processing (e.g., disparity-based estimation). In some implementations, direction may be based on using a sensor to determine a direction of the mobile electronic device's sensor (e.g., camera). In some implementations, direction may be based on using a stored or encoded 2D shape (e.g., parametric description of the shape) of the visual marker and the shape of the visual marker in the image. In some implementations at block 820, the method 800 determines the relative orientation of the visual marker with respect to the mobile electronic device.

At block 830, the method 800 determines a location of the mobile electronic device based on the relative positioning between the mobile electronic device and the visual marker, and a location of the deployed visual marker. In some implementations, the deployed visual marker includes a location service that provides a geolocation of the deployed visual marker in the physical environment. The location of the visual marker may be stored in the cloud, encoded in the visual marker, or provided by the location service accessible upon scanning the visual marker.

In some implementations at block 830, the determined relative positioning and the stored position or provided geolocation of the visual marker are used to determine a position (e.g., geo coordinates, pose, etc.) of the mobile electronic device that can be more accurate than a locally-determined position of the mobile electronic device (e.g., a standalone position using GPS or its own sensors).

In some implementations at block 810, the image of the physical environment is obtained using a sensor (e.g., camera) on the mobile electronic device (e.g., HMD) having a processor. In some implementations, the image is a 2D image or a 3D image. In some implementations, the sensor can be a RGB camera, a depth sensor, a RGB-D camera, one or more 2D cameras, IR cameras, or the like. In some implementations, combinations of sensors are used. In some implementations, the sensor is used to generate a CGR environment representing the physical environment. In some implementations, the CGR environment is generated using VIO or SLAM position tracking or the like at the mobile electronic device. In some implementations, color images can be used. Alternatively, in some implementations, grayscale images can be used.

FIG. 9 is a flowchart illustrating an exemplary method of determining a relative positioning between a mobile device and a visual marker in accordance with some implementations. In some implementations, the method 900 is performed by a device (e.g., controller 100 or electronic device 120 of FIGS. 1-3). The method 900 can be performed for CGR environments using an electronic device or by multiple devices in communication with one another. In some implementations, the method 900 is performed by processing logic, including hardware, firmware, software, or a combination thereof. In some implementations, the method 900 is performed by a processor executing code stored in a non-transitory computer-readable medium (e.g., a memory).

At block 910, the method 900 detects a visual marker in an image of a physical environment. In some implementations, a visual marker with a known or unknown location is detected in a 2D image or 3D image of a mobile electronic device.

In some implementations at block 910, the image of the physical environment is obtained using a sensor (e.g., camera) on the mobile electronic device (e.g., smart phone) having a processor (see block 810).

At block 920, the method 900 determines a relative positioning between the mobile electronic device and the visual marker based on the image. In some implementations, the relative positioning is determined using computer vision techniques (e.g., VIO or SLAM) or PNP techniques (see block 820). In some implementations, the relative positioning determines distance or direction from the mobile electronic device to the visual marker.

At block 930, the method 900 determines a locally-determined location of the visual marker based on the relative positioning between the mobile electronic device and the visual marker and a location of the mobile electronic device (e.g., locally-determined via GPS, etc.). In some implementations, the locally-determined location of the visual marker is determined at the mobile electronic device using signal-based positioning (e.g. satellite/GPS-based, WiFi-based, or blue-tooth-based) of the mobile electronic device at a time of a respective scan of the visual marker.

At block 940, the method 900 provides the locally-determined location of the visual marker to a remote electronic device. In some implementations, the remote electronic device updates a crowd-sourced location of the visual marker using the locally-determined location. In some implementations, the remote electronic device stores the crowd-sourced location of the visual marker at the remote electronic device. In some implementations, the remote electronic device stores the crowd-sourced location of the visual marker in the cloud. In some implementations, the remote electronic device is accessible using the visual marker.

In some implementations, the mobile electronic device provides the locally-determined location of the visual marker to the remote electronic device to increase the accuracy of the crowd-sourced location of the visual marker. In some implementations, the electronic device calculates the new locally-determined location of the visual marker (e.g., geo position) to use (e.g., combine or average) with other locally-determined locations provided by other mobile electronic devices to increase the accuracy of the crowd-sourced location of the visual marker.

FIG. 10 is a flowchart illustrating an exemplary method of determining a location of an object based on a visual marker and the relative positions of a mobile electronic device to the visual marker and the object in accordance with some implementations. In some implementations, the method 1000 is performed by a device (e.g., controller 100 or electronic device 120 of FIGS. 1-3). The method 1000 can be performed for CGR environments using an electronic device or by multiple devices in communication with one another. In some implementations, the method 1000 is performed by processing logic, including hardware, firmware, software, or a combination thereof. In some implementations, the method 1000 is performed by a processor executing code stored in a non-transitory computer-readable medium (e.g., a memory).

At block 1010, the method 1000 detects a visual marker in a first image of a physical environment. In some implementations, a visual marker with a known location is detected in a 2D image or 3D image of a mobile electronic device.

In some implementations at block 1010, the first image of the physical environment is obtained using a sensor (e.g., camera) on the mobile electronic device (e.g., smart phone) having a processor (see block 810).

At block 1020, the method 1000 determines a relative positioning between the mobile electronic device and the visual marker based on the first image. In some implementations, the relative positioning is determined using computer vision techniques (e.g., VIO or SLAM) or PNP techniques (see block 820). In some implementations, the relative positioning determines distance or direction from the mobile electronic device to the visual marker.

At block 1030, the method 1000 determines a relative positioning between the mobile electronic device and an object depicted in a second image of the physical environment. In some implementations at block 1030, the relative positioning between the mobile electronic device and the object is determined based on the second image. In some implementations, the relative positioning is determined using computer vision techniques (e.g., VIO or SLAM) or PNP techniques (see block 820). In some implementations, the relative positioning determines distance or direction from the mobile electronic device to the visual marker.

In some implementations at block 1030, the second image of the physical environment is obtained using a sensor (e.g., camera) on the mobile electronic device (e.g., smart phone) having a processor (see block 810).

At block 1040, the method 1000 determines the location of the object based on the relative positioning between the mobile electronic device and the visual marker, the relative positioning between the mobile electronic device and the object, and a location of the visual marker.

In some implementations, the object is detected in the second image before the visual marker is detected in an image of the physical environment by the mobile electronic device (e.g., upstream images). In some implementations, the object is detected in the second image after the visual marker is detected in the image of the physical environment by the mobile electronic device (e.g., downstream images). In some implementations, the object detected in the second image by the mobile electronic device is updated using information about an updated mobile electronic device location determined between the capture of the second image and the capture of the image of the physical environment by the mobile electronic device. In some implementations, the object detected in the second image by the mobile electronic device is updated using a newly determined geolocation determined using an additional visual marker (e.g., visual marker 710). In some implementations, the location of the visual marker is a crowd-sourced location accessible using the visual marker. In some implementations, the visual marker assisted position of the object detected in the second image of the physical environment by the mobile electronic device is more accurate than a locally-determined position of the object (e.g., a standalone position of the object determined by the mobile electronic device using GPS or its own sensors).

In some implementations, the first image and the second image may be the same image. In some implementations, the first image and the second image are different images separated in time as a person moves the mobile electronic device (e.g., tracked movement of the mobile electronic device).

Figure 11:
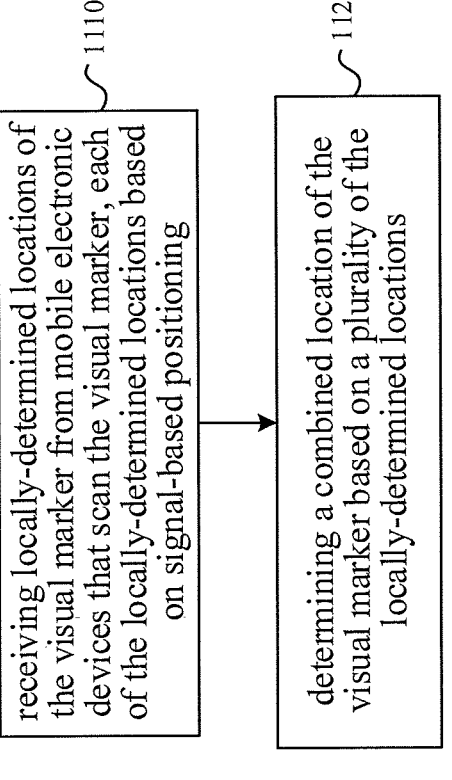
FIG. 11 is a flowchart illustrating an exemplary method of crowd-sourcing visual marker information in accordance with some implementations.

FIG. 11 is a flowchart illustrating an exemplary method of crowd-sourcing visual marker information in accordance with some implementations. In some implementations, the method 1100 is performed by a device (e.g., controller 110 or electronic device 120 of FIGS. 1-3). The method 1100 can be performed for CGR environments using an electronic device or by multiple devices in communication with one another. In some implementations, the method 1100 is performed by processing logic, including hardware, firmware, software, or a combination thereof. In some implementations, the method 1100 is performed by a processor executing code stored in a non-transitory computer-readable medium (e.g., a memory).

At block 1110, the method 1100 receives locally-determined locations of a visual marker that are received from mobile electronic devices that scan a visual marker. In some implementations, each of the locally-determined locations is based on signal-based positioning (e.g. satellite/GPS-based, WiFi-based, or blue-tooth-based) of a respective mobile electronic device at a time of a respective scan of the visual marker.

At block 1120, the method 1100 determines a combined location of the visual marker based on a plurality of the locally-determined locations. In some implementations, the combined location is a crowd-sourced, average, weighted average, combination of a subset, time-based average of a subset, etc. of the plurality of the locally-determined locations.

In some implementations, the received locally-determined locations refines an accuracy of the combined or crowd-sourced location of the visual marker. In some implementations, receiving additional locally-determined location information (e.g., when more and more users scan the visual marker) can be used to update the combined location of the visual marker.

In some implementations, the method 1100 is performed by a remote electronic device having a processor that is accessible using the visual marker. In some implementations, the remote electronic device having a processor is accessed by scanning the visual marker with a mobile electronic device.

In some implementations at block 1110, each respective scan of the visual marker includes an image depicting the visual marker in a physical environment. In some implementations, the image (e.g., 2D or 3D) is obtained using a sensor (e.g., camera) on the mobile electronic device (e.g., smart phone) having a processor (see block 810). In some implementations at block 1110, each respective scan is used to determine a relative positioning between the mobile electronic device and the visual marker based on the image. In some implementations, the relative positioning is determined using computer vision techniques (e.g., VIO or SLAM) or PNP techniques (see block 820). In some implementations, the relative positioning determines distance or direction from the mobile electronic device to the visual marker.

In some implementations, a size of the visual marker is crowd-sourced. In some implementations, each of the received locally-determined locations includes a locally determined size of the visual marker. In some implementations, at least one of the received locally-determined locations includes a locally determined size of the visual marker.

In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at a mobile electronic device having a processor:
detecting a visual marker depicted in an image of a physical environment;
determining, based on performance of visual inertial odometry using the image, a relative positioning between the mobile electronic device and the visual marker, wherein determining the relative positioning comprises determining a three-dimensional vector comprising both a distance and a direction from which the visual marker is disposed relative to the mobile electronic device;
determining, based on data stored by a remote electronic device, a crowd-sourced location of the visual marker;
determining a location of the mobile electronic device based on the relative positioning between the mobile electronic device and the visual marker and the crowd-sourced location of the visual marker;
transmitting from the mobile electronic device to the remote electronic device, the location of the mobile electronic device; and
receiving, from the remote electronic device:
an indication of other visual markers within a threshold distance from the location of the mobile electronic device; and
information related to virtual content associated with the other visual markers.

2. The method of claim 1, further comprising determining the distance using a stored size of the visual marker and a size of the visual marker depicted in the image.

3. The method of claim 1, wherein determining the relative positioning comprises:
decoding a first size of the visual marker encoded in the visual marker; and
determining the distance based on the first size of the visual marker encoded in the visual marker and a second size of the visual marker depicted in the image.

4. The method of claim 1, wherein determining the relative positioning comprises:
determining a crowd-sourced size of the visual marker based on multiple sizes of the visual marker determined from multiple other images; and
determining the distance based on the crowd-sourced size of the visual marker and a size of the visual marker depicted in the image.

5. The method of claim 1, further comprising tracking movement from the location of the mobile electronic device based on a sensor of the mobile electronic device.

6. The method of claim 1, further comprising determining the direction of the three-dimensional vector using a stored two-dimensional (2D) shape or a stored parametric description of the shape of the visual marker and a shape of the visual marker in the image.

7. The method of claim 1 wherein the determining the crowd-sourced location of the visual marker comprises:
requesting the data stored by the remote electronic device based on detecting the visual marker; and
receiving three-dimensional (3D) coordinates identifying the crowd-sourced location of the visual marker from the remote electronic device.

8. The method of claim 1, further comprising providing virtual content in a computer-generated reality (CGR) environment based on the location of the mobile electronic device or the relative positioning between the mobile electronic device and the visual marker.

9. The method of claim 1, further comprising:
determining that the visual marker was or will be positioned at the crowd-sourced location in the physical environment; and
storing the crowd-sourced location of the visual marker on a separate device or encoded in the visual marker.

10. The method of claim 1, wherein the mobile electronic device stores a map identifying locations of a plurality of visual markers.

11. The method of claim 1, wherein metadata associated with the visual marker identifies the visual marker as a moving visual marker, wherein the crowd-sourced location of the visual marker is discarded after a first threshold amount of time, the method further comprising:

receiving an updated crowd-sourced location of the visual marker, wherein the updated crowd-sourced location is a more recently crowd-sourced geolocation than the discarded crowd-sourced location; and determining an updated location of the mobile electronic device based on the relative positioning between the mobile electronic device and the visual marker and the updated crowd-sourced location.

12. The method of claim 11, wherein the metadata is stored on a second electronic device, wherein all requests initiated by decoding the visual marker are sent to the second electronic device.

13. A mobile electronic device comprising:

a non-transitory computer-readable storage medium; and one or more processors coupled to the non-transitory computer-readable storage medium, wherein the non-transitory computer-readable storage medium comprises program instructions that, when executed on the one or more processors, cause the mobile electronic device to perform operations comprising:

detecting a visual marker depicted in an image of a physical environment;

determining, based on performance of visual inertial odometry using the image, a relative positioning between the mobile electronic device and the visual marker, wherein determining the relative positioning comprises determining a three-dimensional vector comprising both a distance and a direction from which the visual marker is disposed relative to the mobile electronic device;

determining, based on data stored by a remote electronic device, a crowd-sourced location of the visual marker;

determining a location of the mobile electronic device based on the relative positioning between the mobile electronic device and the visual marker and the crowd-sourced location of the visual marker;

transmitting from the mobile electronic device to the remote electronic device, the location of the mobile electronic device; and receiving, from the remote electronic device:

an indication of other visual markers within a threshold distance from the location of the mobile electronic device; and information related to virtual content associated with the other visual markers.

14. The mobile electronic device of claim 13, further comprising determining the distance using a stored size of the visual marker and a size of the visual marker depicted in the image.

15. The mobile electronic device of claim 13, wherein determining the relative positioning comprises:

decoding a first size of the visual marker encoded in the visual marker; and determining the distance based on the first size of the visual marker encoded in the visual marker and a second size of the visual marker depicted in the image.

16. The mobile electronic device of claim 13, wherein determining the relative positioning comprises:

determining a first size of the visual marker based on respective sizes of the visual marker determined from multiple other images; and determining the distance based on the first size of the visual marker and a second size of the visual marker depicted in the image.

17. A non-transitory computer-readable storage medium, storing program instructions computer-executable on a computer to perform operations comprising:

at an electronic device having a processor:

detecting a visual marker depicted in an image of a physical environment;

determining, based on performance of visual inertial odometry using the image, a relative positioning between the electronic device and the visual marker, wherein determining the relative positioning comprises determining a three-dimensional vector comprising both a distance and a direction from which the visual marker is disposed relative to the electronic device;

determining, based on data stored by a remote electronic device, a crowd-sourced location of the visual marker;

determining a location of the mobile electronic device based on the relative positioning between the mobile electronic device and the visual marker and the crowd-sourced location of the visual marker;

transmitting from the mobile electronic device to the remote electronic device, the location of the mobile electronic device; and receiving, from the remote electronic device:

an indication of other visual markers within a threshold distance from the location of the mobile electronic device; and information related to virtual content associated with the other visual markers.

18. The method of claim 1, further comprising:

determining an updated location of the visual marker based on an updated relative positioning between the mobile electronic device and the visual marker; and updating the crowd-sourced location of the visual marker based on the determined updated location of the visual marker.

19. The method of claim 5, further comprising determining a location of an object depicted in a second image based on the location of the mobile electronic device, the tracked movement, and a relative positioning between the mobile electronic device and the object depicted in the second image.

* * * * *